United States Patent
Berberig

(10) Patent No.: US 9,157,779 B2
(45) Date of Patent: Oct. 13, 2015

(54) ULTRASONIC, FLOW MEASURING DEVICE HAVING GUIDE VANES PROVIDED TO PREVENT SECONDARY FLOW FORMATION IN THE HOLLOW OPENINGS FOR THE TRANSDUCERS

(75) Inventor: Oliver Berberig, Grenzach-Wyhlen (DE)

(73) Assignee: Endress + Hauser Flowtec AG, Reinach (CH)

( * ) Notice: Subject to any disclaimer, the term of this patent is extended or adjusted under 35 U.S.C. 154(b) by 188 days.

(21) Appl. No.: 13/995,642

(22) PCT Filed: Nov. 23, 2011

(86) PCT No.: PCT/EP2011/070845
§ 371 (c)(1),
(2), (4) Date: Jun. 19, 2013

(87) PCT Pub. No.: WO2012/084392
PCT Pub. Date: Jun. 28, 2012

(65) Prior Publication Data
US 2013/0283930 A1    Oct. 31, 2013

(30) Foreign Application Priority Data
Dec. 21, 2010  (DE) .......... 10 2010 063 789

(51) Int. Cl.
*G01F 1/66* (2006.01)
(52) U.S. Cl.
CPC ..................... *G01F 1/662* (2013.01)
(58) Field of Classification Search
None
See application file for complete search history.

(56) References Cited

U.S. PATENT DOCUMENTS

| | | | |
|---|---|---|---|
| 3,906,791 A | 9/1975 | Lynnworth | |
| 4,173,889 A | 11/1979 | Forster et al. | |
| 5,052,230 A | 10/1991 | Lang | |
| 5,419,326 A | 5/1995 | Harnoncourt | |
| 5,987,997 A | 11/1999 | Roskam | |
| 6,189,389 B1 | 2/2001 | van Bekkum et al. | |
| 6,748,811 B1* | 6/2004 | Iwanaga et al. | 73/861.27 |
| 7,237,441 B2 | 7/2007 | Umekage et al. | |
| 7,380,470 B2 | 6/2008 | Konzelmann et al. | |
| 2002/0124661 A1* | 9/2002 | Wagner | 73/861.23 |
| 2002/0178836 A1* | 12/2002 | Shinmura et al. | 73/861.29 |
| 2006/0156828 A1 | 7/2006 | Konzelmann et al. | |

FOREIGN PATENT DOCUMENTS

| | | |
|---|---|---|
| EP | 0 477 418 A1 | 4/1992 |
| JP | 9-21666 A | 1/1997 |
| JP | 2003-202254 A | 7/2003 |
| WO | 2006/063873 A1 | 6/2006 |

OTHER PUBLICATIONS

German Search Report dated Sep. 27, 2011, issued in Application No. 10 2010 063 789.0, in Munich, Germany.
International Preliminary Report on Patentability dated Feb. 22, 2012, issued in Application No. PCT/EP2011/070845, in Rijswijk, the Netherlands.
International Preliminary Report on Patentability dated Jul. 4, 2013, issued in Application No. PCT/EP2011/070845, in Geneva, Switzerland.

* cited by examiner

Primary Examiner — Harshad R Patel
(74) Attorney, Agent, or Firm — Bacon & Thomas, PLLC

(57) ABSTRACT

An ultrasonic, flow measuring device, comprising an ultrasonic transducer in a bore of a measuring tube, which ultrasonic transducer has an ultrasound window, wherein a guide vane is inserted into the bore of the measuring tube in front of the ultrasound window and perpendicular to the ultrasound window of the ultrasonic transducer.

10 Claims, 3 Drawing Sheets

ULTRASONIC, FLOW MEASURING DEVICE HAVING GUIDE VANES PROVIDED TO PREVENT SECONDARY FLOW FORMATION IN THE HOLLOW OPENINGS FOR THE TRANSDUCERS

TECHNICAL FIELD

The present invention relates to an ultrasonic, flow measuring device, comprising an ultrasonic transducer in a bore of a measuring tube, wherein the ultrasonic transducer has an ultrasound radiating surface, called an ultrasound window herein.

BACKGROUND DISCUSSION

Ultrasonic, flow measuring devices are applied often in process and automation technology. They permit easy determination of volume flow and/or mass flow in a pipeline.

Known ultrasonic, flow measuring devices frequently work according to the Doppler principle or according to the travel-time difference principle. In the travel-time difference principle, the different travel times of ultrasonic pulses as a function of flow direction of the liquid are evaluated. For this, ultrasonic pulses are sent at a certain angle to the tube axis both in, as well as also counter to, the flow direction. From the travel-time difference, the flow velocity, and therewith, in the case of known diameter of the pipeline cross section, the volume flow, can be determined.

Ultrasonic waves are produced, respectively received, with the assistance of ultrasonic transducers. Travel time is ascertained in according to U.S. Pat. No. 5,052,230 by means of short ultrasonic pulses.

In the case of inline, ultrasonic, flow measuring devices, the ultrasonic transducers contact the medium, or fluid. In this way, significantly greater sound power can be coupled into the fluid in comparison to clamp-on-systems, and the ultrasonic transducers can be acoustically decoupled from the measuring tube, whereby the ratio of wanted signal (sound transmission into the fluid) to disturbance signal (sound transmission into the surrounding measuring tube) is improved. Moreover, in this way, in spite of sound measuring paths extending inclined to the main flow, a sound in-coupling extending perpendicularly to the medium-contacting wall can be implemented, which makes the actual measurement effect independent of changes of the velocity of sound.

For fluid contacting mounting of the ultrasonic transducers, lateral openings in the measuring tube are required. The ultrasonic transducers are so secured that the sealing of the measuring tube is assured under all operating conditions. In order to maximize the ratio of wanted signal to disturbance signal, usually an arrangement of the ultrasonic transducers is used, in the case of which the ultrasonic transducers lie opposite one another in a direct line of sight. Alternatively thereto, arrangements are known, in the case of which the sound moves from the transmitter to the receiver via multiple reflections on the measuring tube inner wall.

For the ultrasonic, measuring methods usually applied in inline, ultrasonic, flow measuring devices based on the travel-time difference or a phase difference or a frequency difference, the axis, on which the ultrasonic transducers lie opposite one another, must not be arranged perpendicular to the measuring tube axis, in order to achieve the desired measurement effect. If it is desired, furthermore, that the flow be as undisturbed as possible through the ultrasonic, flow measuring device, excluded likewise is an ultrasonic transducer arrangement parallel to the measuring tube axis, because, in this case, the ultrasonic transducers or reflectors introduced into the measuring tube would lie within the flow.

From these limitations, there results for ultrasonic, flow measuring devices an ultrasonic transducer arrangement, which is typically inclined relative to the measuring tube axis, which leads in connection with the desired medium contact to bores extending transversely through the measuring tube, into which bores the ultrasonic transducers are then externally inserted. If the ultrasonic transducers do not protrude into the flow, e.g. in order that flow losses be minimized and for protecting the units against abrasion or damage, then there result between the ultrasonic transducers and the cylindrical surface of the flowed-through measuring tube, subsequently called the measuring tube boundary surface herein, fluid filled, hollow spaces.

Different flow states can exist in these hollow spaces, especially as a function of the Reynolds (Re) number. These flow states are influenced decisively by the interaction between the measuring tube boundary surface and fluid volume in the ultrasonic transducer bore hollow space. In cases, in which there occur in the hollow space velocity components in the direction of the sound measuring path, these components superimpose on the actual measured variable, namely the velocity components of the main flow in the direction of the sound measuring path. In this way, considerable measurement errors can arise, in the order of magnitude of several percent, depending on the ratio of the ultrasonic transducer bore diameter to the measuring tube inner diameter, respectively ultrasonic transducer hollow space length to measuring path total length.

An approach for correcting this measurement error is to determine the current Re-number and therewith to perform a targeted measuring error correction in the course of the signal processing. Described in U.S. Pat. No. 5,987,997 is a method, which cares for such a subsequent correction of the measured value deviations. Therein, it is provided, based on the ratios of velocities, or the differences of velocities, to determine the Re-number of the flowing fluid along at least two mutually differing measuring paths. This solution is, however, only of limited applicable, since, at the latest, for Re <1000 (=laminar flow profile), the velocity ratios no longer change and therewith a unique determining of the Re-number is no longer possible. Also, for Re >3000, the determination is not always unequivocal. Furthermore, it can in the case of this form of measuring error correction come to considerable additional measured value deviations: In the case of disturbed flow, e.g. behind tube bends or valves, there arise flow states with velocity ratios between different measuring paths in the inline, ultrasonic, flow measuring device, which the signal processing interprets as a certain Re-number, such that a corresponding correction factor should apply. The "real" Re-number, formed from the average flow velocity in the measuring cross section, can, however, be significantly different. Thus, the applied correction factor no longer fits the current flow state, so that an additional measurement error arises.

For preventing interaction between measuring tube boundary surface and the fluid in the above described hollow spaces, FIG. 11 of U.S. Pat. No. 3,906,791 shows a measuring tube flush fitting, lattice insert, which should be acoustically transparent, on the basis of appropriate dimensions. Disadvantageous with this solution is the expected acoustic attenuation, or scattering, of the sound as well as the danger of deposition in the lattice meshes in the case of fluids with solids fractions. FIG. 12 of this document shows a synthetic material, cover plate/membrane for the hollow spaces. Associated with this plate, however, is not only a weakening of the wanted signal, but also sound refraction, which is strongly temperature dependent. Also, the bubble free filling of the hollow space between ultrasonic transducer unit and the plate, a requirement, in the case of use with different static pressures, is quite difficult.

Japanese Patent 2003202254 proposes a solution involving a kind of perforated partition to close off the described hollow spaces. The hollow space between ultrasonic transducer unit and perforated partition should be so embodied that laterally directed sound waves rapidly die out. Such an apparatus leads, however, due to the reduced sound opening, to a weakening of the wanted signal, could plug in the case of fluids with solids fractions, and leads, in the case of use in liquids, to possible trapping of air, which likewise affects the wanted signal strength disadvantageously.

SUMMARY OF THE INVENTION

An object of the invention is to provide an ultrasonic, flow measuring device, which has a high accuracy of measurement throughout a Re-number range extending from laminar flow to highly turbulent flow.

The object is achieved by an ultrasonic, flow measuring device, comprising: an ultrasonic transducer in a bore of a wall of a measuring tube, which ultrasonic transducer has an ultrasound window, wherein: a first guide vane is inserted into the bore in front of said ultrasound window and perpendicular for said ultrasound window of said ultrasonic transducer.

Advantages of the solution of the invention include that no correction of measured values, e.g. by means of a correction algorithm in the signal processing, is necessary for assuring a high robustness, that no weakening of the wanted signal occurs and no mentionable additional pressure loss arises, that the solution is not limited as regards applications of the measuring device, and that the invention is characterized by small manufacturing costs.

The solution of the invention, i.e. the use one or more guide vanes in the described hollow space between ultrasound window and measuring tube boundary surface, effects that the forming of the described secondary flows in these hollow spaces is hindered. This happens, on the one hand, from the geometric subdividing of the hollow space by the guide vanes, which makes the volume for such flows clearly much smaller and provides for an early diversion of moving flow fractions in the hollow space. On the other hand, the additional surfaces bring about additional fluid shear stresses, which result from the interaction between guide vanes and bordering fluid volumes (keyword "wall no-slip condition"). From this there results a reinforced local braking of moved fluid fractions.

These ultrasonic, flow measuring devices of the invention are applied especially for measuring oil as the medium or for measuring media with a kinematic viscosity ν greater than 5 mm$^2$/s, and partially in the case of high viscosity liquids with ν>100 mm$^2$/s).

A guide vane of the invention is an essentially planar, thin plate with approximately planparallel plate surfaces. It can be a piece of sheet material, for instance sheet metal, but it is not limited to such. Thus, the first or other guide vanes can be produced of metal, especially stainless steel such as e.g. 1.4404 or 1.4571, in order to satisfy hygiene specifications. The invention is, however, not limited to these examples. Also, the method of manufacturing the guide vanes is not limited to rolling metal into sheet. The guide vanes can be made of synthetic material (e.g. plastics), glass or ceramics or composite materials and it does not matter how these guide vanes are produced. The concept, guide vanes, concerns only the shape of the same.

In an embodiment of the invention, the guide vanes extend to the measuring tube boundary surface, because the secondary flow components originate there due to the interaction between the main flow and the fluid volume in the bore hollow space.

Other embodiments result from the number of installed guide vanes per bore hollow space, from the orientation of the guide vanes in reference to the principal flow direction in the measuring tube, which especially corresponds to the longitudinal axis of the measuring tube, from the type of securement of the guide vanes in the bore hollow space, e.g. on the bore wall, the ultrasound window or at an annular gap around the ultrasonic transducer, or from the structural embodiment of the guide vanes in the vicinity of the ultrasound window, e.g. with cutouts for preventing deposits.

BRIEF DESCRIPTION OF THE DRAWINGS

The invention can be provided in numerous forms of embodiment. Some thereof will now be explained in greater detail based on the figures of the drawing. Equal elements are provided in the figures with equal reference characters. The figures of the drawing show as follows.

DETAILED DISCUSSION IN CONJUNCTION WITH THE DRAWINGS

Figure 1:
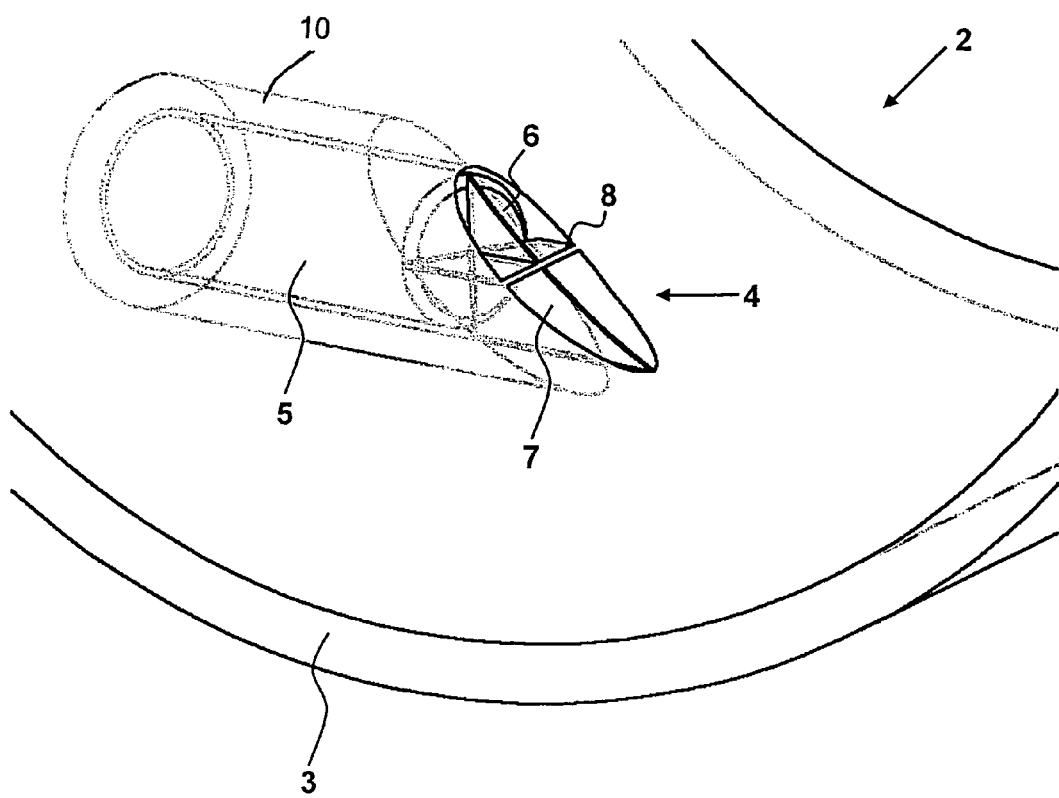
FIG. 1 is an ultrasonic transducer with guide vanes of the invention arranged cross shaped in the bore.

FIG. 1 shows an ultrasonic, flow measuring device of the invention, comprising an ultrasonic transducer 5 in a bore 4 of a measuring tube 2. Ultrasonic transducer 5 has an ultrasound window 6. A first guide vane 7 is, in such case, inserted in the bore 4 of the measuring tube 2 in front of the ultrasound window 6 and perpendicular to the ultrasound window 6 of the ultrasonic transducer 5. The ultrasonic, flow measuring device is an inline, ultrasonic, flow measuring device, which includes the measuring tube 2. The ultrasound window 6 is also called an active area. Through this ultrasound window 6, ultrasonic signals are out-coupled from the ultrasonic transducer 5 or in-coupled into the ultrasonic transducer 5.

Bore 4 in the measuring tube 2, or, more exactly stated, in the wall 3 of the measuring tube 2, in which the ultrasonic transducer 5 and the first guide vane 7 are inserted, has a longitudinal axis (not shown). For travel-time difference measurement by means of the ultrasonic, flow measuring device, bore 4 is inclined relative to the principal flow direction of the medium in the measuring tube 2. In the case of multi-beam, measuring devices, the bore longitudinal axes lie parallel to one another in a first plane and supplementally parallel to a second plane, in which the measuring tube longitudinal axis lies. If, now the bore longitudinal axes would be shifted parallel into the second plane, they would intersect the measuring tube longitudinal axis at an angle not equal to 90°. The angles for the ultrasonic signal paths between two ultrasonic transducers of a conventional inline, ultrasonic, flow measuring device, in which the ultrasonic transducers lie opposite one another, especially whose ultrasound windows lie in parallel planes, and in which an ultrasonic signal path forms a straight line, with which also the two bore longitudinal axes coincide, in which bores the two ultrasonic transducers are inserted, lie typically between 30 and 60° to the measuring tube longitudinal axis and therewith to the principal flow direction of the medium in the measuring tube.

If the ultrasonic, flow measuring device is a one beam, measuring device, then only two oppositely lying ultrasonic transducers 5 are provided, between which only one signal path extends and this, as a rule, intersects the measuring tube longitudinal axis. Then, of course, none of the above described parallel shifting, or displacement, is necessary. If, in contrast, a multi-beam device with a plurality of signal paths is present, these are, most often, offset from the center and, thus, from the second plane of the measuring tube longitudinal axis.

Bore 4 in this form of embodiment of the invention has a longitudinal axis in the first plane parallel to the second plane of the measuring tube longitudinal axis, wherein the separation of the two planes is greater than 10%, especially greater than 25%, of the diameter of the measuring tube 2. Involved here is, thus, a multi-beam-ultrasonic, flow measuring device, for example, a four beam-ultrasonic, flow measuring device, and its illustrated section has a ultrasonic transducer 5 displaced out from the center of the measuring tube 2. The invention is applicable also in one beam-, two beam or multi-beam, ultrasonic, flow measuring devices, especially in the case of such, which determine flow by means of the travel-time difference principle.

In the case of the construction of the invention, the bore 4 in the measuring tube wall 3 forms a hollow space in the measuring tube wall 3. This hollow space is partially filled by the ultrasonic transducer 5 installed therein. It is thus unilaterally at least partially bordered by the ultrasound window 6 of the ultrasonic transducer 5. If the bore 4 is not brought completely through the measuring tube wall 3, the inner surface of the measuring tube wall 3 borders the volume of the measuring tube 2 and therewith the therein located medium. When the bore 4 breeches the inner surface of the measuring tube wall 3, this changes the measuring tube wall 3. The just described, original inner surface of the measuring tube 2, especially in the region the bore 4, is subsequently referred to herein as the measuring tube boundary surface. Bore 4, and therewith the hollow space in the measuring tube wall 3 formed by it, are bordered by the measuring tube boundary surface. The first guide vane 7 is inserted in the hollow space of the bore 4 not filled by the ultrasonic transducer 5 between the ultrasound window 6 of the ultrasonic transducer 5 and the measuring tube boundary surface in the bore 4 of the measuring tube 2 in its measuring tube wall 3 perpendicular to the ultrasound window 6 of the ultrasonic transducer 5. In such case, guide vane 7 is thin in comparison to its longitudinal- and/or transverse dimensions, here perpendicular to the ultrasound window 6 of the ultrasonic transducer 5. It includes, thus, a mentionable expanse parallel to the longitudinal axis of the bore. Thus, not involved here are laths, e.g. of a lattice, without mentionable expanse perpendicular to their longitudinal axis.

Thus, the first guide vane 7 is thin in comparison to the diameter of the bore 4. It is also thin in comparison with the diameter of the ultrasound window 6. For example, its thickness amounts to only 1% to 3% of the diameter of the bore 4.

The first guide vane 7 protrudes according to an embodiment insignificantly into the interior of measuring tube 2. It contacts the imaginary measuring tube boundary surface, but does not cut through it. Its edge facing the interior of the measuring tube 2 and, thus, facing away from the ultrasound window 6 of the ultrasonic transducer 5, forms the contour of the measuring tube boundary surface. In simplifying this, such edge could, however, also be formed by one, two or more straight line segments or of some other shape, which approximates the contour of the measuring tube boundary surface.

The ultrasonic transducer 5 has here a circularly round, ultrasound window 6, so that the ultrasound window 6 has a diameter. The width of the first guide vane 7 perpendicular to the longitudinal axis of the bore corresponds, for example, at least to the diameter of the ultrasound window 6. Here it equals the diameter of the bore 4, since the bore 4 here is circular. Otherwise, corresponding equivalents of the diameter are to be taken into consideration. Since, such as above described, the first guide vane 7 simulates on its edge facing the interior of the measuring tube 2 the contour of the measuring tube boundary surface, it is here approximately triangularly shaped, since the ultrasound window 6 likewise approximately contacts the measuring tube boundary surface. Otherwise, other structures of the first guide vane, for example, trapezoidally shaped, provide options by way of simplification. Therefore, it has this width on at least one side, here on its edge facing the ultrasound window 6. However, there are also embodiments, such as explained later in greater detail with respect to FIG. 3, in which the edge of the first guide vane facing the ultrasound window can have cutouts and therewith not the entire width of the first guide vane is filled with vane material.

Depending on application, the presence of one guide vane can be sufficient to fulfill the object of the invention. In the illustrated embodiment, however, two are provided. The ultrasonic, flow measuring device of the invention includes thus a second guide vane 8 in the bore 4 in front of the ultrasound window 6 and perpendicular to the ultrasound window 6 of the ultrasonic transducer 5. The second guide vane 8 is here trapezoidally shaped. All above explanations with reference to the first guide vane 7 are also applicable for the second guide vane 8 and hold correspondingly also for the second guide vane and/or a third guide vane or other guide vanes, in case present. I.e. here the second guide vane 8 is naturally likewise thin and protrudes insignificantly into the measuring tube 2.

The second guide vane 8 is in the illustrated embodiment inserted into the bore 4 perpendicularly to the first guide vane 7. The second guide vane 8 lies here in the first plane of the longitudinal axis of the bore. The first guide vane 7 is, thus, perpendicular to this first plane. The described positions of the guide vanes 7 and 8 relative to the first plane of the longitudinal axis of the bore parallel to the plane of the measuring tube longitudinal axis depend on the relevant conditions, such as flow velocity, viscosity and Re-number of the medium in the measuring tube and/or bore diameter and position of the bore 4 relative to the center of the measuring tube 2. Angles between 0 and 45°, thus 5°, 10°, 15°, 20°, 25°, 30°, 35°, 40° or 45° of the second guide vane relative to the first plane provide options, respectively angles between 0° and 90° of the first guide vane 7 relative to the first plane. Also, the two guide vanes do not need to be perpendicular to one another. Thus, in this case, angles between 0 and 90° provide options, thus 5°, 10°, 15°, 20°, 25°, 30°, 35°, 40°, 45°, 50°, 55°, 60°, 65°, 70°, 75°, 80°, 85° and 90° are possible angles of the guide vanes relative to one another. For example, this is the case, when a further, third guide vane is inserted into the bore of the measuring tube in front of the ultrasound window and perpendicular to the ultrasound window of the ultrasonic transducer. Then the angles between the guide vanes can be of equal size, thus, in this case, 60°.

Figure 2:
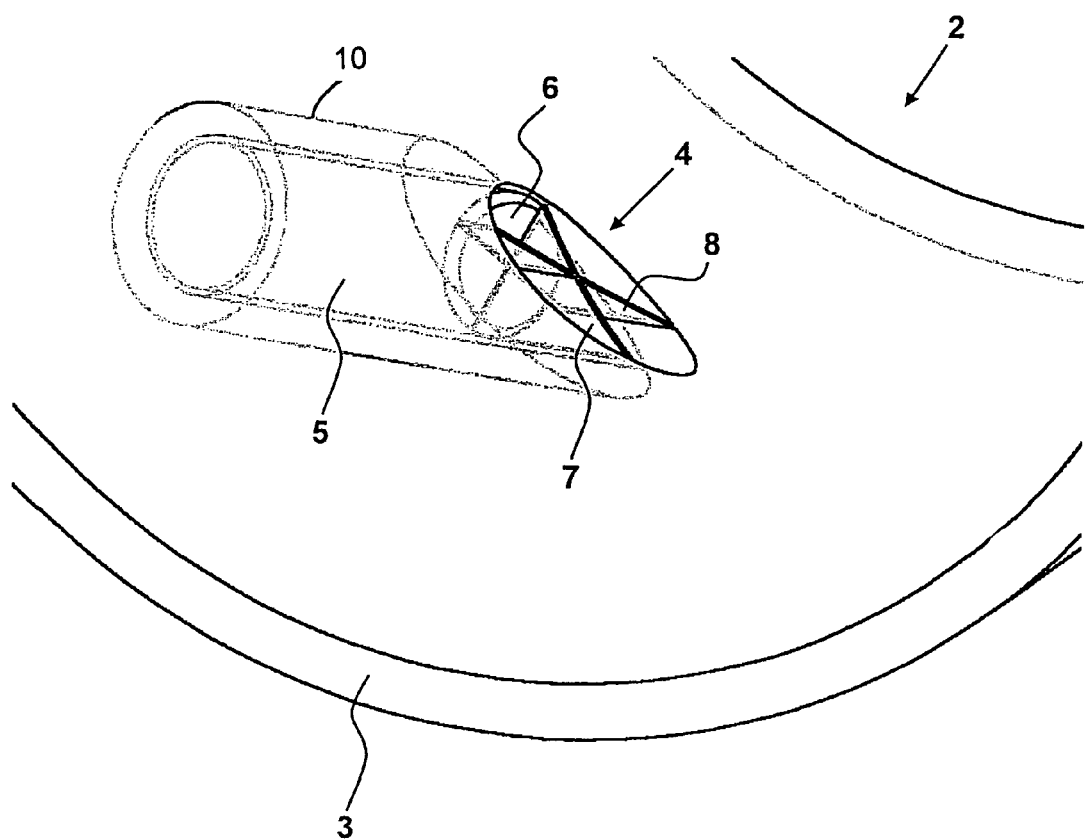
FIG. 2 shows the ultrasonic transducer of FIG. 1 with guide vanes of the invention arranged cross shaped in the bore and turned 45° with respect thereto.

FIG. 2 shows an ultrasonic, flow measuring device of the invention, wherein the longitudinal axis of the bore lies in a first plane parallel to a second plane of the measuring tube longitudinal axis, wherein the first guide vane 7 lies in a third plane at an angle of 45° to the first plane of the longitudinal axis of the bore. Also here, a second guide vane 8 is inserted into the bore 4 of the measuring tube 2 in front of the ultrasound window 6 of the ultrasonic transducer 5 and perpendicular to the first guide vane 7.

The inline, ultrasonic, flow measuring device of the invention minimizes flow related, measured value deviations caused by the hollow spaces between ultrasonic transducers 5 and measuring tube boundaries.

As already mentioned above, the positions of the guide vanes relative to the first plane of the longitudinal axis of the bore parallel to the plane of the measuring tube longitudinal axis depend on various parameters.

Figure 3:
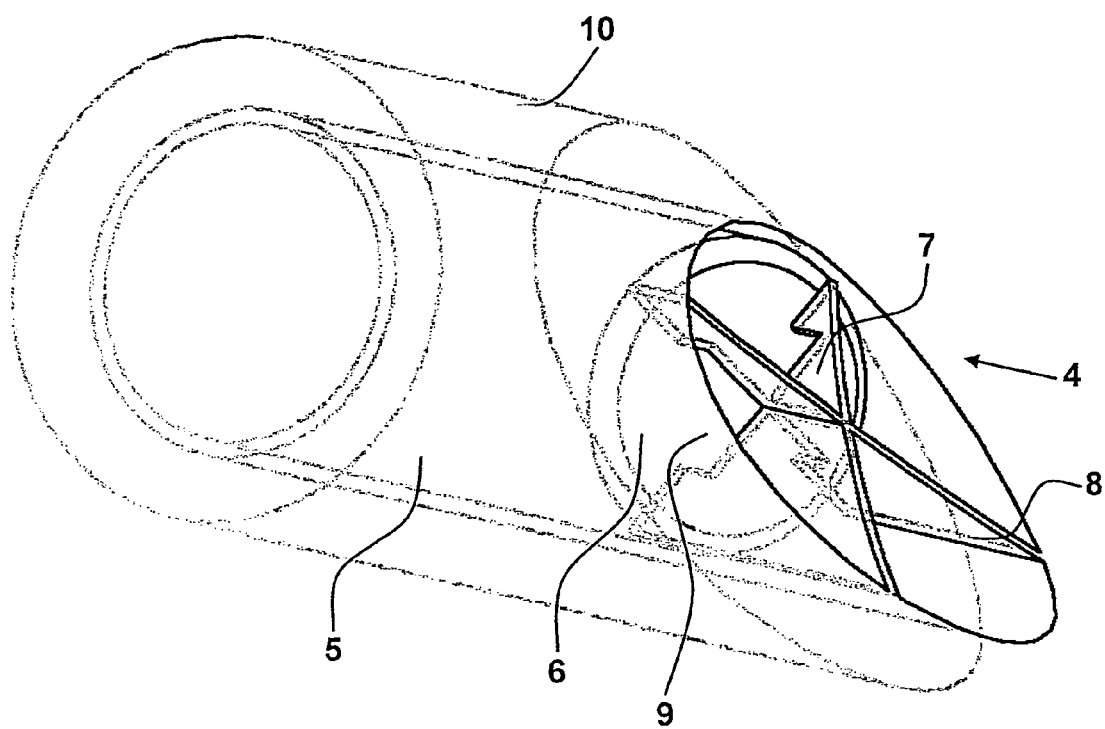
FIG. 3 is an ultrasonic transducer with guide vanes of the invention showing cutouts in the guide vanes.

FIG. 3 illustrates that the first guide vane 7 has cutouts 9, which face the ultrasound window 6 and serve for preventing deposits. The cutouts 9 directly in front of the ultrasound window 6 enable a flow of medium, which has vanishingly small or no influence on the measurement of the flow of the medium through the measuring tube 2, but which does, however, help to prevent deposits. As also can be seen in the first two figures, there is between the ultrasonic transducer 5 and the measuring tube wall 3 an annular gap 10, since the ultrasonic transducer 5 does not completely fill the bore 4 radially to the longitudinal axis of the bore. The guide vanes can be so embodied that they at least partially reach into this annular gap 10.

LIST OF REFERENCE CHARACTERS

1 ultrasonic, flow measuring device
2 measuring tube
3 measuring tube wall
4 bore in the measuring tube wall
5 ultrasonic transducer
6 ultrasound window
7 first guide vane
8 second guide vane
9 cutout
10 annular gap between ultrasonic transducer and measuring tube wall

The invention claimed is:

1. An ultrasonic, flow measuring device, comprising:
   an ultrasonic transducer in a bore of a wall of a measuring tube, which ultrasonic transducer has an ultrasound window, wherein:
   a first guide vane is inserted into the bore in front of said ultrasound window and perpendicular to said ultrasound window of said ultrasonic transducer;
   a second guide vane is inserted into the bore in front of said ultrasound window and perpendicular to said ultrasound window of said ultrasonic transducer; and
   said second guide vane is inserted into the bore perpendicularly to said first guide vane.

2. The ultrasonic, flow measuring device as claimed in claim 1, wherein:
   said first guide vane is thin in comparison to the diameter of the bore.

3. The ultrasonic, flow measuring device as claimed in claim 1, wherein:
   said first guide vane has a width perpendicular to a longitudinal axis of the bore, which width equals at least the diameter of said ultrasound window.

4. The ultrasonic, flow measuring device as claimed in claim 1, wherein:
   said first guide vane has a width perpendicular to a longitudinal axis of the bore, which width equals the diameter of the bore.

5. The ultrasonic, flow measuring device as claimed in claim 1, wherein:
   said first guide vane does not protrude, or protrudes only insignificantly, inwardly into the measuring tube.

6. The ultrasonic, flow measuring device as claimed in claim 1, wherein:
   said first guide vane is cutout facing the ultrasound window.

7. The ultrasonic, flow measuring device as claimed in claim 1, wherein:
   the longitudinal axis of the bore lies in a first plane parallel to a second plane of the measuring tube longitudinal axis; and
   said first guide vane lies in a third plane at an angle of 45° to the first plane of the longitudinal axis of the bore.

8. The ultrasonic, flow measuring device as claimed in claim 1, wherein:
   at least one additional, third guide vane is inserted into the bore in front of said ultrasound window and perpendicular to said ultrasound window of the ultrasonic transducer.

9. The ultrasonic, flow measuring device as claimed in claim 1, wherein:
   the longitudinal axis of the bore lies in a first plane parallel to the second plane of the measuring tube longitudinal axis, with a mutual separation of at least 10% of the diameter of the measuring tube.

10. The use of an ultrasonic, flow measuring device as claimed in claim 1, wherein:
    oil or a medium having a dynamic viscosity greater than 5 kg/(m*s) flows through the measuring tube.

* * * * *